Patented Aug. 14, 1945

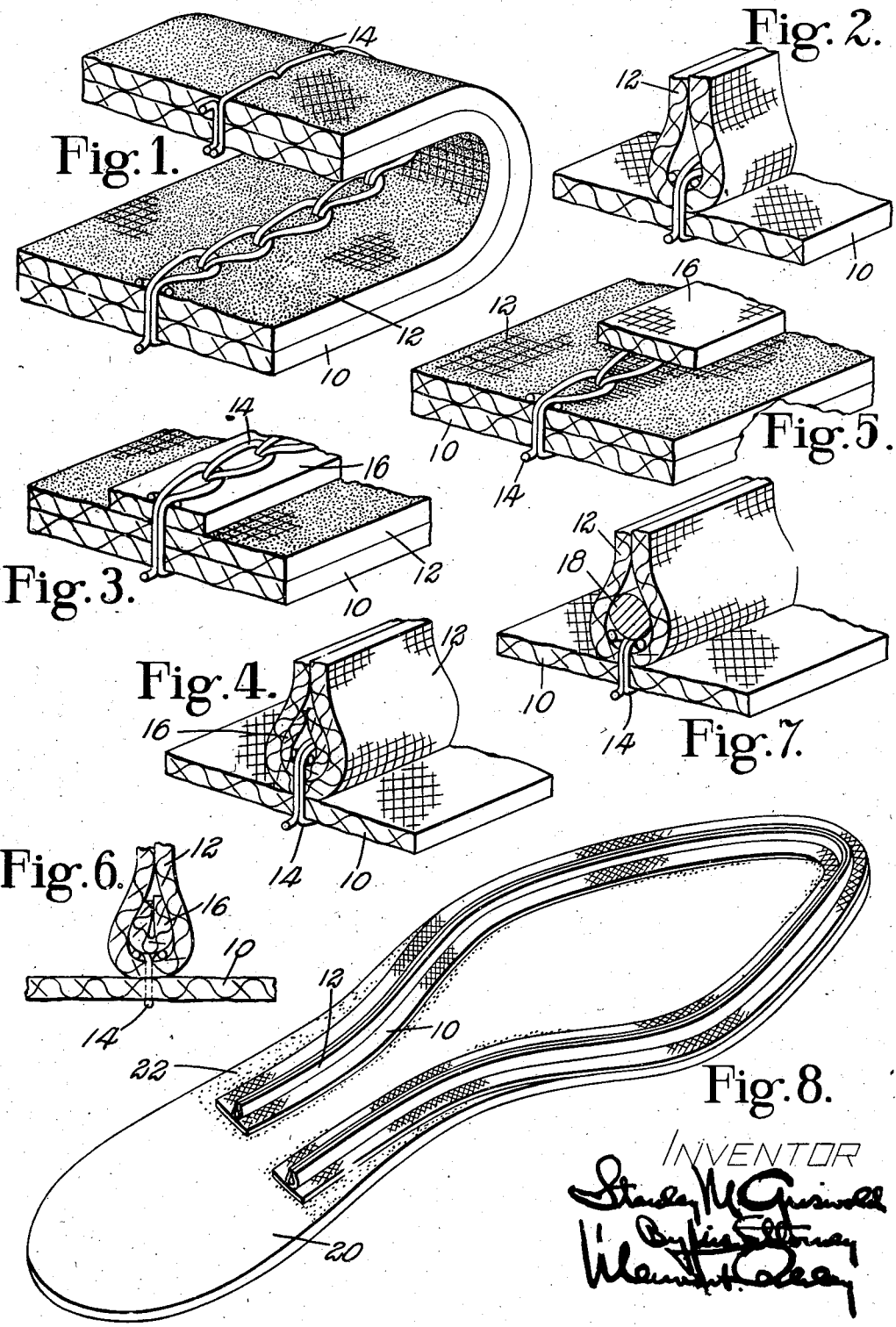

2,381,950

UNITED STATES PATENT OFFICE 2,381,950

MANUFACTURE OF INSOLES

Stanley M. Griswold, Newton, Mass., assignor to B. B. Chemical Co., Boston, Mass., a corporation of Massachusetts Application July 29, 1943, Serial No. 496,546

7 Claims. (Cl. 36—22)

This invention relates to the manufacture of insoles for Goodyear welt shoes, and particularly to composite strips adapted for application to insole bodies to form sewing lips thereon, and to methods of making and utilizing said strips.

Objects of this invention are to effect economies in the manufacture of insoles and to provide an improved insole having a substantial rib firmly attached by cement alone to the body of the insole.

Futrher objects of the invention are to improve and simplify the composite ribbed strips disclosed in United States Letters Patent No. 2,288,448, granted June 30, 1942, on my application, without sacrificing their advantages.

The composite strip may comprise two layers of textile material of indefinite length each coated on one side with cement, for example pressure-responsive cement such as rubber cement, latex cement or cement comprising synthetic rubber-like material. The layers are arranged with their uncoated sides in contact and are directly connected together longitudinally and continuously of the strip intermediate the margins of the layers over a wide transverse portion approximately equal to the width of the base of the insole rib by a single continuous line of chain stitching.

The layers forming the strip may be identical and may be either square cut or bias cut. Preferably one of the layers is square cut and the other bias cut, the chain of the stitches lying on the square-cut layer. The bias-cut layer is adapted for attachment flatwise, for example by cement, to the marginal portion of an insole to form a base or support for the insole rib, and the marginal portions of the square-cut layer are adapted to be turned up about the chain of the stitches and pressed against each other to form an insole rib which, in cross-section, increases in width from the outer edge of the rib toward its base; that is, the rib has a wide base and tapers outwardly from the base. These two layers of the composite strip will be referred to as the rib-forming strip or layer and the base layer or strip.

If desired, the rib-forming layer may be stiffened by applying thereto any of the stiffening materials disclosed in my prior patent referred to above, and the insole body to which the composite strip is to be attached to form a sewing rib thereon may be made of cheap or thin leather or other suitable material. The marginal portion of the insole body is coated with cement, preferably with pressure-responsive cement of one of the kinds mentioned, and the cemented side of the base layer of the composite strip is pressed against the insole to cause the strip to adhere thereto, care being taken that the area of attachment over which the layers are held together, that is, the line of chain stitches, shall occupy the position of the between-substance in a channeled insole. The marginal portions of the rib-forming layer may be turned up and pressed against each other to cause them to adhere and form the rib before the base layer is attached to the insole or after the base layer has been so attached, or the rib-forming operation may be performed in conjunction with the attachment of the base layer to the insole.

In order to produce a thicker and firmer rib, a third strip of fabric or equivalent material, which may for the sake of economy be considerably narrower than the rib-forming layer, is applied to the central portion thereof and may be secured thereto with cement over the chain stitching or it may be applied prior to the insertion of the stitches and the three layers united by the chain stitching, the chain of the stitches then lying upon the third strip so that, when the marginal portions of the rib-forming layer are turned toward each other, the third or reinforcing strip will by this action be folded upon itself about the chain of the stitches and will form a wide base and a two-layer reinforcement for the rib.

In place of the third reinforcing layer, a cord or strip of material of the desired cross-section may be laid over the chain of the stitches, for example, in conjunction with the operation of turning these portions up and pressing them together. Preferably the dimensions of the core will be such that the marginal portions of the rib-forming layer will meet beyond the core and will enclose the core in the rib-forming layer.

These and other features and aspects of the invention will appear more fully from the following detailed description when read in connection with the accompanying drawing and will be pointed out in the appended claims.

In the drawing,

Fig. 1 is a perspective view of a portion of the composite rib-forming strip comprising two layers united by a chain stitch seam;

Fig. 2 is a fragmentary perspective view showing the marginal portions of one of the layers of the composite strip folded against each other to enclose the chain of the stitches;

Fig. 3 is a perspective view of a modified form in which a reinforcing strip is applied to the rib-forming layer prior to the union of the strips by the chain stitch;

Fig. 4 is a similar view of a portion of the strip shown in Fig. 3, after the marginal portions of the rib-forming layer have been turned up to cause the reinforcing layer to be folded about the chain of the stitches;

Fig. 5 is a view similar to Fig. 3 in which the reinforcing strip is applied after the base layer and rib-forming layer have been secured together by a line of chain stitching;

Fig. 6 is an end view of the composite strip constructed as shown in Fig. 5 after the rib-forming layer has been folded about the chain stitches and has thereby enclosed the reinforcing strip;

Fig. 7 is a perspective view of a modified form in which a cord or core has been applied over the chain of the stitching prior to its being enclosed by folding up the marginal portions of the rib-forming layer; and Fig. 8 is a perspective view of an insole to which a composite ribbed strip embodying the present invention has been attached to form a sewing rib thereon.

The composite ribbed strip of the present invention is made, as illustrated in Fig. 1, by providing two strips of textile material such as Gem duck, one for the base layer 10 and the other for the rib-forming layer 12. The layer 10 is coated on its lower side and the layer 12 on its upper side, as indicated by stippling, with cement, preferably pressure-responsive cement such as rubber cement, latex cement or cements comprising synthetic rubber-like materials. The layers 10 and 12 are attached to each other along a narrow longitudinal area between their edges by a single line of chain stitching 14 which serves to extend the area of attachment between the strips beyond what would be provided by a single line of usual lock stitches. The chain of the stitches serves, when the free margins of the strip 12 are folded about it, to form a wide base for the rib and cause it to taper outwardly in cross-sectional thickness.

Preferably and as indicated in the drawing, the base layer 10 is a bias-cut tape and the layer 12 is a square-cut tape. When the base layer is bias cut it conforms more readily to the contour of the insole which it must follow when applied thereto. Since the edges of the rib-forming layer are free to bend upwardly during the application of the composite strip to the insole, the rib-forming layer will readily conform to the contour of the insole and hence a square-cut tape, which is more economical, may be used for this layer.

The square-cut rib-forming layer 12 is preferably formed by cutting Gem duck lengthwise of the warp so that the filler or woof threads, which are stronger than the warp threads, will extend transversely of the strip and in the direction of lasting strains when the upper is secured in lasted position to the rib. The stronger threads will also be embraced by the inseam stitches when the shoe is welted.

The layer 12 is preferably stiffened in the manner disclosed in my prior patent above mentioned, for example by treatment with a 70% solution of Nuba in equal parts of benzol and naphtha.

If a still firmer rib is desired, the composite strip may be made as illustrated in Figs. 3 to 6. In Fig. 3 a reinforcing member such as a canvas strip 16 has been laid upon the rib-forming layer 12 and the three layers united by a line of chain stitches 14. In Fig. 4 the free marginal portions of the strip 12 have been folded toward each other, causing the strip 16 to be folded about and to enclose the chain of the stitches 14. If desired, a similar result may be obtained by laying the reinforcing strip 16 over the chain of the line of stitches inserted through the base layer and rib-forming layer, as shown in Fig. 5. The result of folding together the marginal portions of the rib-forming layer 12 is shown in Fig. 6 where the chain of the stitches and the folded reinforcing strip 16 are enclosed by the rib-forming layer 12.

Similar results may be obtained by utilizing a cord or core 18 as the reinforcing member, the cord or core being laid upon the chain of the stitches prior to folding up the marginal portions of the rib-forming layer 12, as shown in Fig. 7.

The marginal portions of an insole body 20 of suitable material are coated with cement of the kind above mentioned, as indicated by the stippling at 22, and the base layer 10 is located at the proper distance from the edge of the insole and pressed thereon, as shown in Fig. 8. A machine for performing the rib-attaching operation is disclosed in Letters Patent of the United States No. 2,326,119, granted August 10, 1943, upon application of Frederic E. Bertrand.

The single chain stitch seam presents many advantages in that a single coarse thread of indefinite length may be used, no change of bobbins being required, the chain of the stitches provides a sufficiently wide base about which to bend the layer or layers which form the rib, and, in case two rib-forming layers are employed, they may both be secured to the base layer by the single line of chain stitches, the chain of which is embraced by the two layers, the marginal portions of which are folded toward each other, the chain giving breadth and substance to the four thicknesses of material which form the rib. Also, when three strips are sewed together by the chain stitches, it is unnecessary to secure the second and third layers together by cement.

Having thus described my invention, what I claim as new and desire to secure by Letters Patent of the United States is:

1. A strip for forming ribs on insoles comprising a base layer, a rib-forming layer and a reinforcing layer applied to the rib-forming layer, the lower surface of the base layer being coated with cement whereby said layer is adapted to be secured throughout the extent of its cemented surface to an insole body, the upper surface of the rib-forming layer being coated with cement, all of said layers being connected together between their edges by a single continuous line of chain stitching the chain of which lies upon the reinforcing layer so that when the marginal portions of the rib-forming layer are folded toward each other to form the rib they will enclose both the reinforcing layer and the chain of the stitches and the rib will taper outwardly of the base layer.

2. A composite strip for attachment to insoles to form sewing ribs thereon comprising a base strip cemented on its lower exposed surface, and a plurality of rib-forming strips of different widths secured to the uncemented side of the base strip by a line of chain stitches, the chain of the stitches being on the narrower of the plurality of rib-forming strips, the free margins of the wider rib-forming strip being folded toward each other and secured together to enclose the chain stitches and the narrow rib-forming strip.

3. An insole comprising an insole-shaped body, a strip secured by cement alone to the marginal portion of the body, and a sewing rib held by chain stitches to said cemented strip, the rib comprising two layers one narrower than the other folded upon themselves and both enclosing the chain of the stitches, the margins of the wider rib-forming layer being secured together to enclose the narrower layer and the chain of the stitches.

4. An insole for use in making welted shoes comprising an insole body, a base layer strip secured by cement alone to the marginal portion of the insole body, and a plurality of strips attached by a single line of chain stitches to the central portion of said base layer strip, the free marginal portions of said plurality of layers being turned upwardly and secured together to form a sewing rib.

5. That improvement in methods of forming composite strips for attachment to insoles which comprises providing a base strip attaching a plurality of strips of material between their edges to the base strip by a line of chain stitches and folding the free margins of all of the strips except the base strip to enclose the chain of the stitches to form a sewing rib, the margins of the base strip forming attaching flanges.

6. That improvement in methods of forming composite strips for attachment to insolves to form sewing ribs thereon which comprises providing a strip cemented on one side to form a base layer, attaching a plurality of strips one narrower than the other to the base layer by a line of chain stitches, and turning up the margins of the wider strip to enclose the narrower strip and the chain of the stitches.

7. That improvement in methods of making insoles which comprises providing a composite strip composed of a base layer and a plurality of strips secured together by a continuous line of chain stitching, said base layer being provided with pressure-responsive cement on the face opposite the plurality of strips, applying pressure-responsive cement to the marginal portion of an insole body, pressing the cemented face of the base layer upon the cemented area of the insole body, and raising and pressing together portions of the plurality of strips not secured to the base layer.

STANLEY M. GRISWOLD.